No. 657,700. Patented Sept. 11, 1900.
B. HOLT.
TRAVELING HARVESTER.
(Application filed June 14, 1900.)
(No Model.) 2 Sheets—Sheet 2.
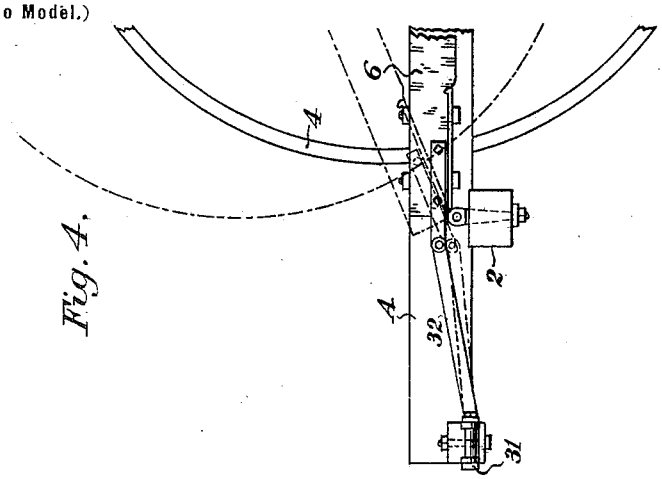
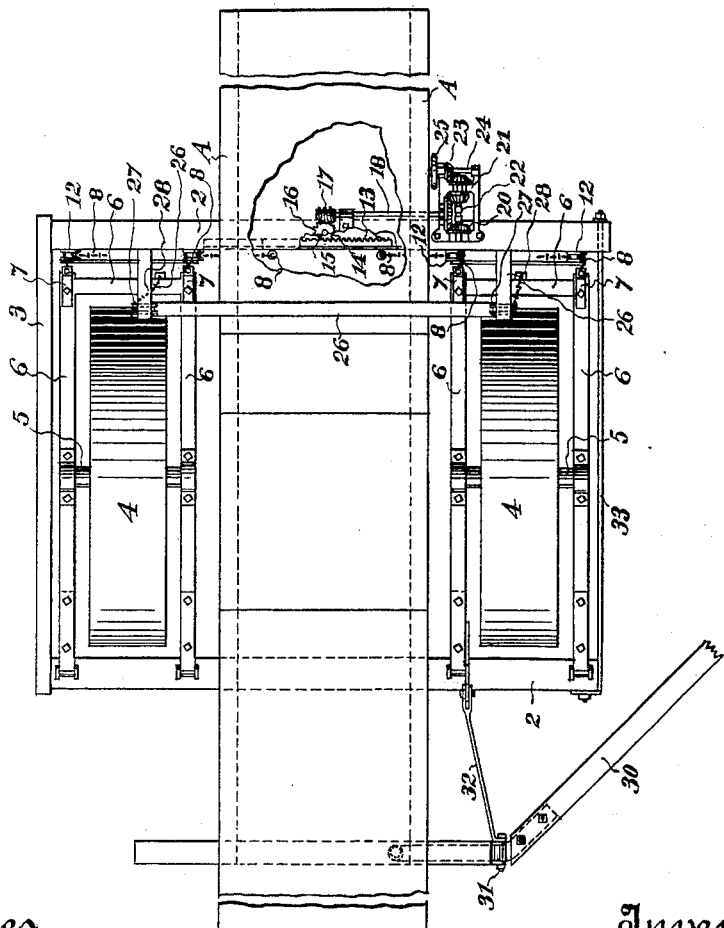
Witnesses,
E. A. Brandan
G. H. Annse
Inventor,
Benjamin Holt
By Dewey Strong & Co.
Attys

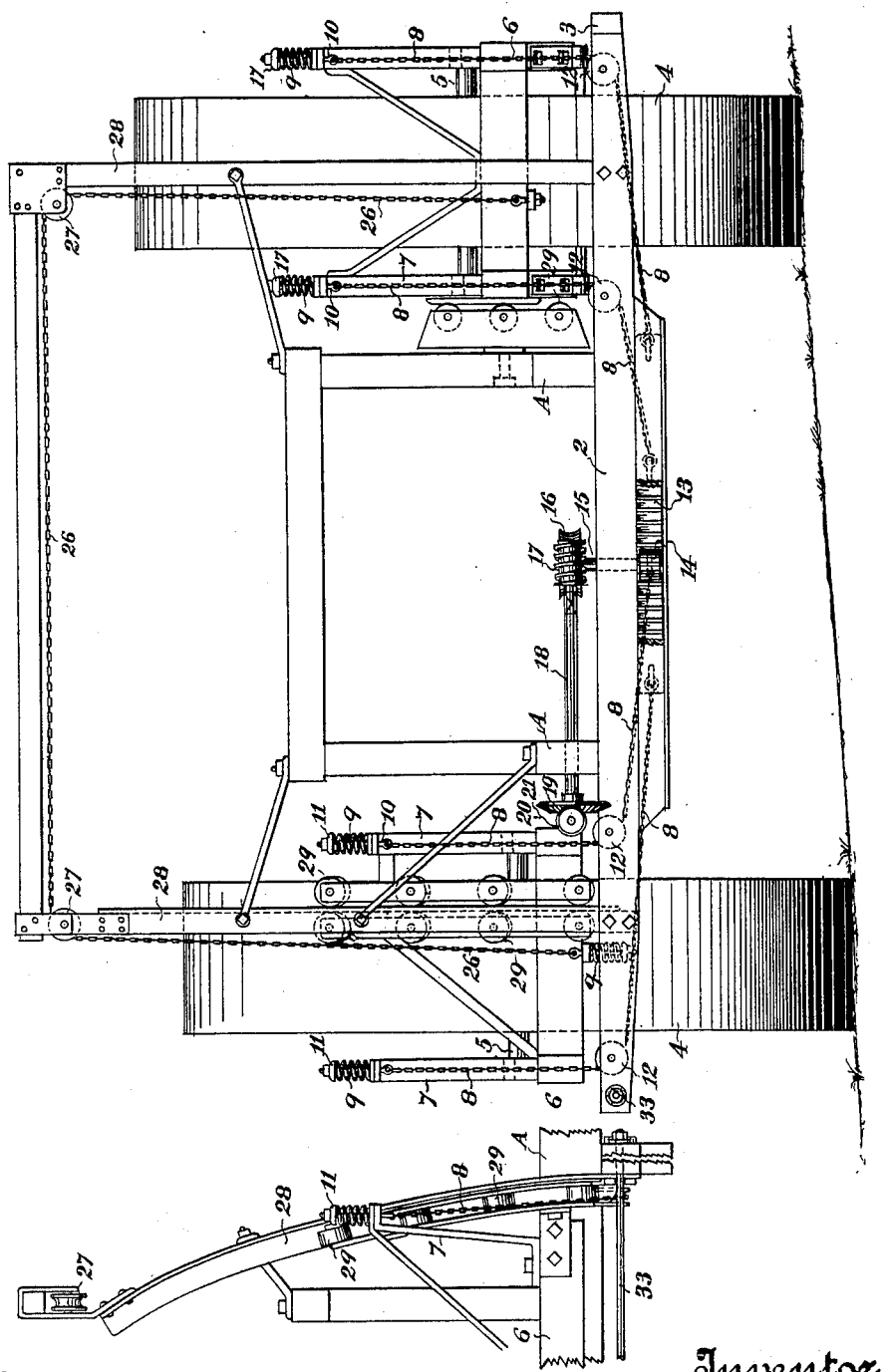

UNITED STATES PATENT OFFICE.

BENJAMIN HOLT, OF STOCKTON, CALIFORNIA.

TRAVELING HARVESTER.

SPECIFICATION forming part of Letters Patent No. 657,700, dated September 11, 1900.

Application filed June 14, 1900. Serial No. 20,229. (No model.)

*To all whom it may concern:*

Be it known that I, BENJAMIN HOLT, a citizen of the United States, residing at Stockton, county of San Joaquin, State of California, have invented an Improvement in Traveling Harvesters; and I hereby declare the following to be a full, clear, and exact description of the same.

My invention relates to improvements in that class of apparatus designed to cut, thresh, clean, and sack grain, and which travels over the field in which the grain stands, so as to complete the operation during its travels.

The object of my invention is to enable a traveling harvester and thresher to be used on side hills and maintain the frame of the thresher and cleaner in an approximately-horizontal position by raising the wheels on one side and lowering the wheels on the other side with relation to the thresher-frame, so that while the wheels travel in different horizontal planes upon the inclined surface of the ground the threshing-machine frame will be maintained in the desired position. My invention comprises, in conjunction with these movable wheels, mechanisms by which the up-and-down movement of the wheels is effected simultaneously. It also comprises details of construction which will be more fully explained by reference to the accompanying drawings.

Figure 1 is an end view of the apparatus. Fig. 2 is a portion of a side view. Fig. 3 is a plan on a half-scale to Fig. 1. Fig. 4 is a portion of a side view of the hinged swinging frames.

A A are the main longitudinal sills of the threshing-machine, having transverse timbers 2 bolted across them, with exterior timber 3 and rod 33 parallel to those of the main frame and forming the space within which the main bearing-wheels 4 travel, these being usually known as the "wheel-frames." The greater portion of the weight of the machine is carried upon these wheels, and the front of the machine is usually carried upon a horizontally-turnable steering-wheel, by which the course of the machine is directed through suitable connecting mechanism.

The grain is cut by what is known as a "header," consisting of a frame projecting from the right side of the threshing-machine frame and connected therewith by a suitable form of joint, which allows the sickle upon the header to lie approximately parallel with the surface of the ground over which it is passing, independent of the means by which it may be raised or lowered to cut high or low grain, the object of this parallelism being to cut the grain as nearly even as possible from one end to the other of the sickle.

The main bearing-wheels 4 have independent journal-shafts 5 turning in suitable boxes, and they are so arranged that they may be moved up and down independently of each other and independently of the main frame A of the threshing-machine. As illustrated in the present case, the journal-boxes of the wheel-shafts are fixed to supplemental frames 6, which are sufficiently smaller than the space between the beams A and 3 and the beam A and rod 33 to allow them and the wheels which are journaled upon them to be moved inside of the fixed main frame. The frames 6 are hinged at one end to the transverse beam 2, which is contiguous to that end, and at the other end are fixed vertical standards 7, to the upper ends of which chains 8 are secured.

In order to relieve the shock and jolts of passing over uneven ground and to cushion the parts, I have shown springs 9 of any suitable or desired description. In the present case these springs are supported upon the tops of the standards and have central openings through which strong bolts 10 pass. These bolts are screw-threaded at the upper end, have nuts fitting upon them, and washers or disks 11 rest upon the top of the springs. The lower ends of the bolts are so constructed as to form connections for the ends of the chains 8. These chains pass down around direction-pulleys 12, journaled upon the transverse beams 2, and they lead thence in an approximately-horizontal direction inwardly toward the center of the main frame, where they are attached to a transversely-movable rack-bar 13. This rack-bar is slidable crosswise of the machine in suitable guides and is engaged near the center by a pinion 14, fixed upon the vertical shaft 15, and this shaft has a worm-wheel 16 keyed or otherwise fixed to it. This worm-wheel is engaged by a worm or screw 17, which is fixed upon a horizontal shaft 18, suitably journaled upon the frame, and this shaft may be rotated by connection with any suitable moving portion of the apparatus with suitable means by which its rotation may be reversed.

The operation of the machine will then be as follows: The chains 8, which connect with one of the movable wheel-frames 6, lead inwardly and are connected with the rack 13 from the side upon which the wheel is located, and the chains from the other wheel in the same manner lead in from the opposite side of the main frame and are connected with the rack-bar. It will thus be seen that when the rack-bar is moved in one direction it draws the chains 8 from the opposite side and allows the chains upon the side toward which the rack-bar is moving to be extended. This movement acting through the standards 7 upon the wheel-frames 6 will pull the wheel-frame down upon the side where the chains are shortening and will in like manner allow the other wheel-frame to rise. Thus the first wheel will be lowered with reference to the main frame of the threshing-machine and the other wheel will be raised, and this action will accommodate the wheels to the inclination of the surface over which they are passing without materially altering the transverse horizontality of the main frame. If the slope of the hill is slight, but short movement of the adjusting mechanism is necessary. If it is considerable, the movement is correspondingly increased and the simultaneous movement of one of the main bearing-wheels downwardly and the other upwardly will regulate the position of the machine to any desired slope upon which the work is to be carried on. As the wheels of the machine are thus raised and lowered they do not tip to one side or the other, but remain in vertical planes transverse to their axis, so that whatever the weight of the machinery carried upon them the pressure upon the wheels will be essentially vertical and will not produce an opposite thrust upon the hubs, as will be the case if they were tilted to one side or the other, and as the wheels always stand upon what is termed a "plumb spoke" the center of gravity of the machine is always maintained nearly central between the wheels, thus making it impossible to upset the machine upon any side hill where it is capable of being operated.

In order to move the slidable rack-bar 13 backward or forward, so as to move the wheels to conform to the varying slopes of the hillside, a reversing mechanism of some description is employed in conjunction with the device, so that the rotation of the shaft 18 may be made in either direction to advance the rack-bar, as before described. Various mechanisms may be employed for this purpose. As shown in the present case, the shaft 18 has upon its outer end a beveled gear-wheel 19. This gear-wheel meshes with pinions 20 and 21, which are loosely turnable upon the shaft, which shaft has a clutch 22, slidable upon a feather intermediate between the pinions 20 and 21. This clutch and the shaft are rotated by means of beveled gears 23, one of which is mounted upon the clutch-shaft and the other upon a shaft 24, and this shaft 24 has a sprocket or gear wheel 25, fixed upon it and receiving motion from some movable part of the machinery, so that the shaft 24 will be continuously revolved, and through the gears 23 motion will be transmitted to revolve the shaft and the clutch 22. When the clutch is set midway between the gears 20 and 21, no movement of either of these gears will take place, and the slidable rack-bar 13 will remain at whatever point it may occupy when the clutch is thrown out of engagement until such time as it is desirable to again move the rack-bar to alter the position of the wheels to suit some change in the inclination of the ground-surface. The clutch 22 is then moved by a suitable clutch-lever (not here shown) to engage with the clutch member carried by one or the other of the gears 20 and 21, and the shaft 18 will then be revolved in the direction which will be determined by whichever of the gears 20 or 21 is engaged with the gear 19. The other gear in either case not being engaged by the clutch will turn loosely or as an idler.

In order to insure the movement of the wheels and the arms 6 in unison, I have shown a chain 26, having its ends connected with the movable parts of the wheel-frames and passing over guide-pulleys 27, so that as one wheel-frame rises the other is depressed. The chain will correspondingly move over these guide-pulleys in unison with the movements of the parts with which it is connected. The ends of this chain may also be connected with springs or elastic connections similar to those shown at 9. As here constructed the wheel-frames 6 are hinged, as before described, at one end and the other ends are free to move up and down. In order to steady the movement, I have shown curved arcs 28, having the lower ends fixed to the transverse frame-timbers 2 and suitably braced from the main frame. These arcs serve as guides. Rollers 29, attached to and carried by the movable ends of the wheel-frames 6, press against opposite sides of the curved flanges 28, and thus serve to steady the movement of the parts and relieve them from side strains caused by the lurches of the machine. The curved arcs 28 are preferably made of angle, T, or channel iron or steel, or some form which has sufficient rigidity in both directions on a transverse sectional line, and these or their equivalents and the roller-supports may be suitably braced.

The header-frame and connected parts are similar to those in common use upon this class of machines. 30 is the rear diagonal timber of such a frame, hinged, as shown at 31, and having a brace-bar, as at 32. The outside timber, which unites the ends of the transverse timbers 2 upon the left side, is omitted upon the side contiguous to the header-frame, and in place of such a timber I employ a rod 23, here shown as fixed at one end to one of the timbers 2 and screw-threaded at the other end and provided with a suitable washer and nut to maintain the proper tension and rigidity. This rod occupies less space and gives room for the movement of the hinged and connected parts.

Having thus described my invention, what I claim as new, and desire to secure by Letters Patent, is—

1. The combination in a traveling harvester of a main frame for supporting threshing and cleaning mechanisms, supplemental frames in which the main bearing-wheels are journaled upon opposite sides of the machine, means for moving one of said wheels up and the other down at the same time, consisting of a transversely-movable guided rack-bar, chains connecting said rack-bar with each of the movable wheel-frames, and means for moving the rack-bar transversely in either direction.

2. The combination in a traveling harvester of a main frame to support threshing and cleaning mechanisms, bearing-wheels journaled in supplemental frames upon opposite sides of the main frame, means for moving said wheels up or down consisting of flexible chains or connections having one end attached to the wheel-frames, a transversely-slidable rack-bar to which the other ends of said chains are connected, means for moving said rack-bar in either direction, consisting of a pinion engaging its teeth, a worm-gear and a shaft carrying a screw engaging the gear, and mechanism by which said shaft is revolved in either direction.

3. The combination in a traveling harvester of a main frame adapted to support the threshing and cleaning mechanisms, supplemental frames in which the bearing-wheels are journaled upon opposite sides of the machine, standards fixed to movable parts of said frames, chains connected with the upper ends of said standards, direction-pulleys around which said chains pass, a transversely-slidable guided rack-bar with which the other ends of the chains are connected, a mechanism by which the rack-bar is moved in either direction to simultaneously raise one wheel and lower the other.

4. The combination in a traveling harvester of a main frame upon which the threshing and cleaning mechanisms are carried, supplemental frames in which the bearing-wheels are journaled upon opposite sides of the main frame, mechanism by which one wheel-frame is raised and the other lowered, consisting of a transversely-slidable guided rack-bar, with mechanism by which it is moved in either direction, chains connected with said rack-bar extending outwardly in opposite directions, guide-pulleys around which said chains pass, standards fixed upon the wheel-frames and carrying cushioned supports with which the ends of the chains are connected.

5. The combination in a traveling harvester of a main frame, supplemental frames in which the main bearing-wheels are journaled upon opposite sides of the machine, a rack-bar guided and slidable transversely with relation to the main frame, a mechanism by which said rack-bar is movable in either direction, chains connected with the bar extending outwardly in opposite directions, guide-pulleys around which the chains pass, standards carried by the wheel-frames to which the outer ends of the chains are connected, and a chain passing tranversely across the machine over guide-pulleys and having its ends connected with the wheel-frames.

6. The combination in a traveling harvester of a main frame, supplemental frames in which the main bearing-wheels are journaled upon opposite sides of the machine, a rack-bar guided and slidable transversely with relation to the main frame, a mechanism by which said rack-bar is movable in either direction, chains connected with the bar extending outwardly in opposite directions, guide-pulleys around which the chains pass, standards carried by the wheel-frames to which the outer ends of the chains are connected, anti-frictional rollers or slides carried by the movable wheel-frames, and fixed guides against which they are movable.

In witness whereof I have hereunto set my hand.

BENJAMIN HOLT.

Witnesses:
 GEO. H. COURE,
 G. A. DICKENSON.